United States Patent [19]

Hayat et al.

[11] Patent Number: 4,563,084

[45] Date of Patent: Jan. 7, 1986

[54] METHOD AND APPARATUS FOR FORMING COMPLEX PHOTOGRAPHIC IMAGES FROM A SET OF OBJECT-FIGURES

[76] Inventors: Eric S. Hayat, 5, rue Paulin Mery, 75013 Paris; Max P. de Ferran, 4 Grande Rue, Bazainville, 78550 Houdan, both of France

[21] Appl. No.: 503,844

[22] Filed: Jun. 13, 1983

[30] Foreign Application Priority Data

Jun. 23, 1982 [FR] France ................................ 82 10969

[51] Int. Cl.[4] ................................................ G03B 27/52

[52] U.S. Cl. .......................................... 355/40; 355/75

[58] Field of Search ......................... 355/40, 53, 54, 75

[56] References Cited

U.S. PATENT DOCUMENTS

| | | | |
|---|---|---|---|
| 1,945,926 | 2/1934 | Tolhurst | 355/40 |
| 2,255,319 | 9/1941 | Kanter | 355/75 |
| 2,510,363 | 6/1950 | Anderson | 355/75 |
| 2,654,289 | 10/1953 | Flynn | 355/40 |
| 2,866,397 | 12/1958 | Gillette | 355/40 |
| 3,286,586 | 11/1966 | Whitney | 355/40 |
| 3,904,291 | 9/1975 | Webster | 355/40 |
| 4,150,991 | 4/1979 | Dillow | 355/40 |
| 4,183,663 | 1/1980 | Greenly et al. | 355/53 |
| 4,285,592 | 8/1981 | Sassenberg | 355/53 |
| 4,417,810 | 11/1983 | Ueda et al. | 355/40 |

OTHER PUBLICATIONS

JSMPTE, vol. 78, No. 5, May '69, pp. 334–336.

*Primary Examiner*—Monroe H. Hayes

*Attorney, Agent, or Firm*—Darby & Darby

[57] ABSTRACT

This invention relates to a method and device for forming composite images on a photosensitive medium, starting from a set of object-figures arranged in a support, the image being formed on the photosensitive medium (13) by means of an optical system (4).

According to the invention, each object-figure from this set (7) having first been selected is positioned on the optical axis (8) by displacement along two directions perpendicular to this axis, each exposure being made after this object-figure has been positioned along these two directions by electromechanical drive means, the selection and positioning of object-figures, as well as the sequence of exposures being controlled by a calculator (23) on the basis of a pre-established program.

Multiple exposures are made with a flash tube (2), and the optical system (4) preferably has a variable focal length which may be automatically adjusted under control by the calculator (23).

8 Claims, 4 Drawing Figures

METHOD AND APPARATUS FOR FORMING COMPLEX PHOTOGRAPHIC IMAGES FROM A SET OF OBJECT-FIGURES

This invention relates to a method and apparatus for producing a complex image on a photosensitive surface, starting from a set of figurative elements, hereinafter designated as "object-figures". The purpose of this invention is to produce, on a single photosensitive surface, a composite image of a plurality of original pictures, selected from a pre-defined set, arranged in correlation with a computer program corresponding to a specific desired application. These "object-figures" may preferably be in the form of transparencies, for instance photographic slides or drawings traced on a translucent sheet, etc. . . . , assembled into a pre-defined set, from which the computer program may select those object-figures which are to be sequentially copied onto a photosensitive support so as to form a single composite image.

BACKGROUND OF THE INVENTION

There are already existing computerized methods and means for automatic high-speed photosetting of texts which have to be printed.

In these devices or methods, the data are supplied to the computer in the form of a pre-established text which is automatically recomposed as letters are sequentially projected upon a photosensitive support, using a combination of horizontal scanning and vertical scrolling, following the sequential order given by the text which is to be reproduced.

According to the various types of known devices, and owing to the trend towards increasingly faster operation, the means being used are either electromechanical (rotating drums or disks, movable photosensitive surfaces) or more or less electronic, using cathode ray tubes (CRT) or laser beams, while the motions always consist of a horizontal sweep by a light beam and a vertical scrolling of the photosensitive surfaces.

These devices provide no possibility of forming a composite image, starting from figurative elements which must initially be arranged into highly diversified spatial configurations, on the basis of specific data. This will be the case, for instance, when it is desired to obtain an image of the sky map, including a lay-out of constellations and planets, together with figurative symbols, starting from localisation data (longitude and latitude) and time data (day and hour). The purpose of this invention is to provide means for achieving a result of this kind.

SUMMARY OF THE INVENTION

This invention relates to a method and apparatus for producing a composite photographic image on a single photosensitive surface of a plurality of original pictures selected, with the help of a computer program, from a pre-arranged set of transparencies, for being sequentially reproduced upon this photosensitive medium.

The apparatus according to this invention comprises a light-tight enclosure containing:

- a flashing light source,
- a photographic optical system,
- a support containing a pre-defined set of object-figures,
- electromechanical means for selecting an object-figure and for positioning said figure in the "object" position on the optical axis,
- electromechanical means for shifting this figure along two directions perpendicularly to the optical axis, and
- a photosensitive surface placed in the imaging position on the optical axis, this apparatus further comprising means for controlling flashes from a luminous source, the above-defined means being controlled by a calculator device provided with a keyboard comprising numerical, alphanumerical and function keys for causing the photosensitive surface to be impressed through sequential flashes by the various object-figures as these become positioned sequentially one by one relatively to the optical axis, according to a pre-established program.

As previously stated, an "object-figure" should be understood to mean a translucent surface on which is traced a drawing or a symbol or any other figurative element, such as for instance a photographic picture.

When mentioning a "pre-defined set of object-figures", this means a finite number of object-figures, selected and arranged on or within a support in correlation with the data processing program corresponding to a specific application, thus distinguishing this set from a magazine in which the object-figures are interchangeable or displaceable, while this magazine may be reloaded by the user who may select the disposition, the order or the number of pictures according to his own wishes.

The feature of this invention, according to which every object-figure in the set constituted in this way may, after having been selected, be moved along two axes perpendicularly to the optical axis, makes it possible to localize, in any desired position, the complete image or a partial image of each object-figure on the photosensitive surface, prior to each shooting, whatever the sequential order of utilization of the object-figures.

The method of this invention will thus consist in using a defined set of object-figures in which every object-figure may, after being selected, be moved along two axes perpendicularly to the optical axis, each shooting taking place after this object-figure has been positioned along these two directions under control from electromechanical means, while the selection and the positioning of each object-figure, as well as the sequence of shots are determined by a calculator on the basis of a pre-established program.

Further features of the invention, providing for the setting-up of more elaborate systems, include:

1. A rotary displacement of the photosensitive surface about the optical axis, relatively to the set of object-figures, while the method comprises a phase for angularly orienting the photosensitive support, relatively to the object-figure having been selected before each shot.

2. The photographic optical system has a variable focal length and the method comprises a phase for adjusting the focal length before each shot, for allowing the image to be enlarged as desired.

The invention lends itself to many various applications, some of which will be described as non-limitative examples:

Mapping the sky as it can be seen from any geographic location at a given time

In this case, the object-figures will be photos of constellations and planets, possibly associated to symbolic designs, and the computer will be programmed for sequentially positioning every object-figure, wholly or in part, and reproducing them by means of sequential flashes upon the photosensitive medium as a function of the location data (latitude and longitude) and time data (year, day, precise hour) entered by the operator using the keyboard. This application may be used for teaching purposes or for historical or scientific research.

Representation of a preferred route, marked with arrows, starting from a given point.

An apparatus according to this invention may be placed in any location within a town for indicating the course to join another point in this town, under the form of a representation of the town map marked with arrows showing the recommended route. The entry data will be the name of the street and the house number in this street, where the user wishes to go. The set of object-figures will be formed by a background image representing the town map, a portion of this image being reproduced on the resulting image, with a marking of the starting point (location of the device) and arrows showing the route, the names of the streets to be followed, etc. . . .

A further application consists in forming on the photosensitive medium symbolic images of astrological themes, the set of object-figures being formed of symbolic representations of zodiacal signs, of luminaries, planets, astral houses and other elements of the astral theme, the entry data being location data and time data, while the resulting image will be the figure of the particular astral theme corresponding to these data.

A further application relates to the production of images with an ornamental or aesthetic character, composed from figurative elements constituting the set of object-figures, these elements being placed, relatively to each other, according to entry data and/or according to a program which may comprise, for a part, random or arbitrary factors.

A print obtained by means of this invention may be used as an intermediary in the manufacturing of objects on which the composite image will be reproduced.

As regards practical embodiments of the invention, various possibilities are available to knowledgeable persons in respect of the configuration of the support for a set of object-figures, of the means for selecting an object-figure and moving it along two directions, as well as of the design of the optical system, of the rotary support for the photosensitive medium and of the flash tube controls.

Preferred embodiments include the following features:

(a) The various object-figures are inscribed within a frame with the same format, and the format of the photosensitive medium is no larger than the image of said first format through the the selected optical setting. Thus, the entire field of the photosensitive surface may be covered, starting from one single object-figure.

(b) Each object-figure is covered by a mask provided with an aperture corresponding to the part of the object-figure which is to be reproduced on the photosensitive medium. The combination of this feature with the former one allows placing the figurative element carried by an object-figure at any point of the photosensitive surface while avoiding the whole surface becoming exposed through successive flashes from the light source, even though the background of each object-figure is black.

(c) The support carrying the set of object-figures is in the form of a juxtaposition of object-figures in a same plane lying perpendicularly to the optical axis within a movable frame movable along two perpendicular directions in this plane.

Controlling these two perpendicular motions makes it possible to achieve through the same means, on the one hand the selection and the initial positioning of an object-figure on the optical axis, and on the other hand its accurate final positioning relatively to this axis.

(d) The supporting frame is slidably mounted and driven by a lead screw inside a carrier frame which is slidable along a perpendicular direction inside the light-tight housing and is also driven by a second lead screw.

(e) The photosensitive surface is mounted in a rotary circular frame supported by rollers in a support member linked to the housing, said rotary frame being driven around by a drive pinion or friction roller.

(f) The photosensitive surface is mounted inside a dark chamber which is removably mounted on the rotary frame.

(g) This dark chamber is provided with an ejector device for ejecting a print or for moving to the next picture.

(h) At least one of the controls for moving an object-figure or for varying the focal length is equipped with a position sensor for delivering to the computer a signal indicating the corresponding position. This feature allows for a precise automatic positioning, without requiring the apparatus being initially provided with high-precision controls.

The invention will now be described in further detail with reference to the appended drawings in which.

DETAILED DESCRIPTION OF THE INVENTION

Figure 1:
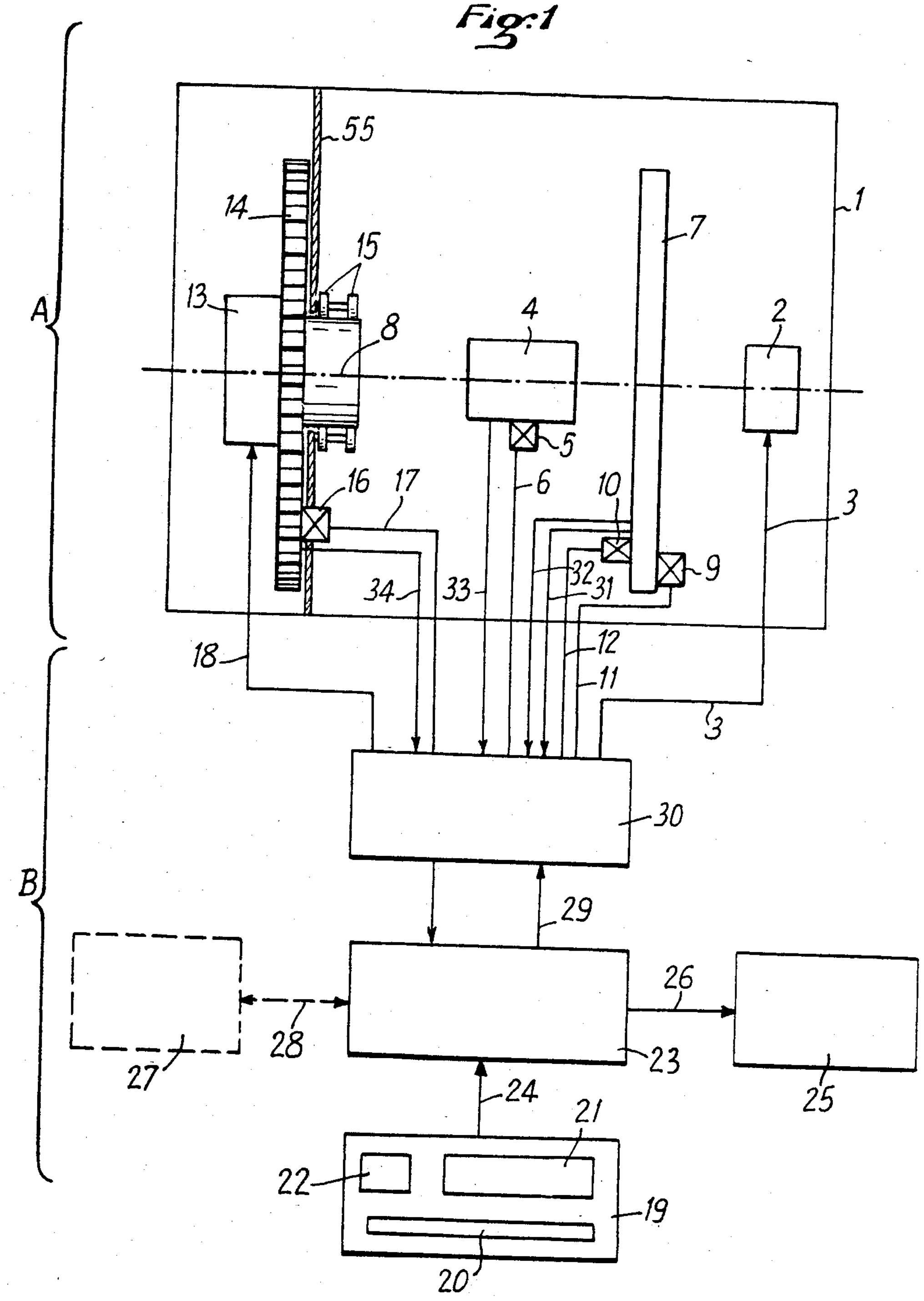
FIG. 1 is a diagram of a preferred embodiment of an apparatus according to the invention.

Referring to FIG. 1, the device of the invention comprises an optical section A associated with a calculating and data-entry section B.

Figure 3:
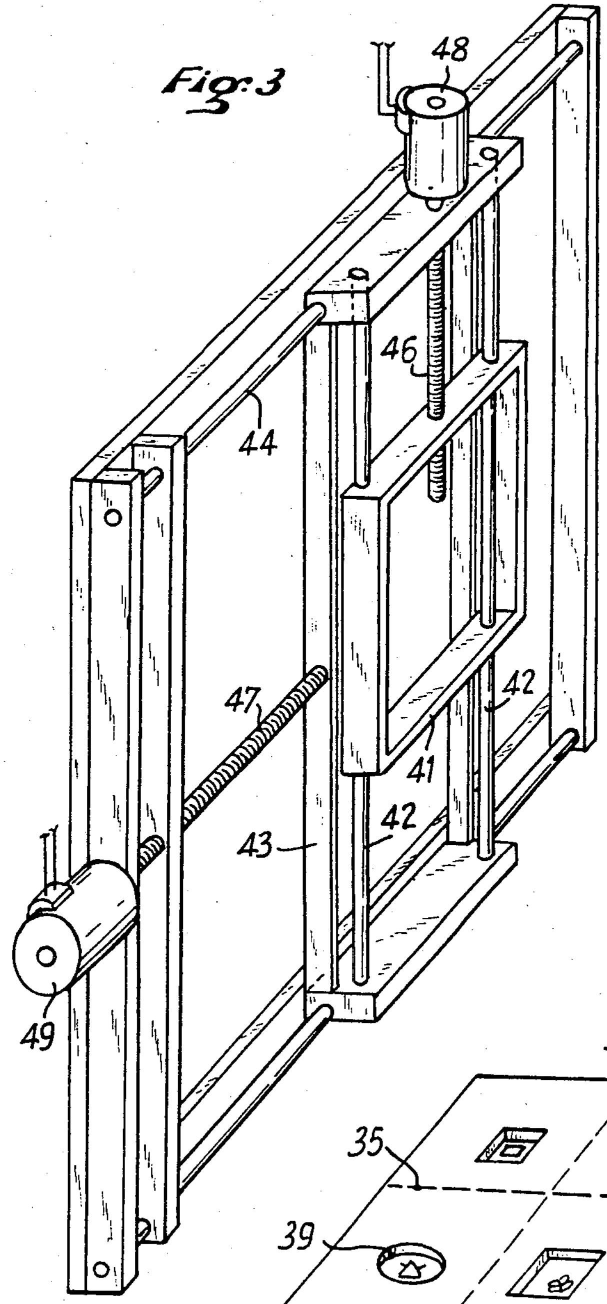
FIG. 3 is a diagrammatic perspective view of slidable frames for selecting and positioning an object-figure.
Figure 2:
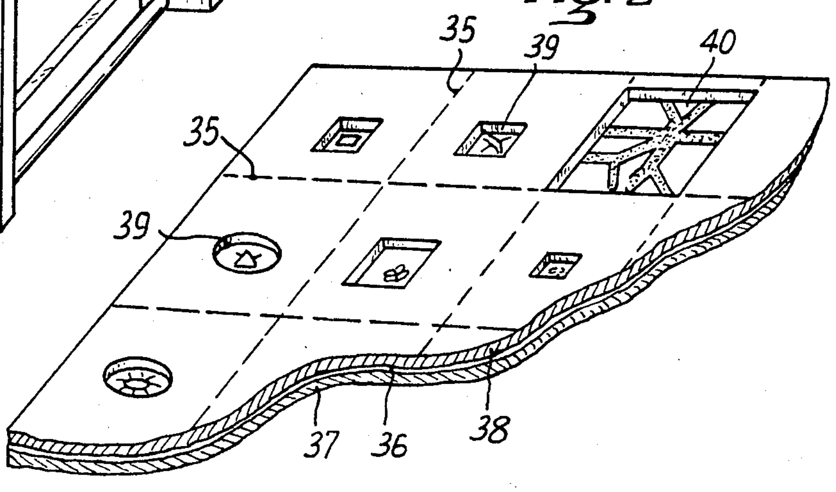
FIG. 2 is a perspective view of a support carrying an array of object-figures.

The optical section comprises a light-tight enclosure 1 in which are contained:

- an electronic flash tube 2 connected by a line 3 to an electrical control unit;
- a photographic optical system 4 which is, in the example shown, a zooming system driven by a motor 5 electrically controlled through a connection line 6;
- a support 7 carrying an array of object-figures which may for instance consist of a rectangular frame, as shown in FIG. 2 and 3, carrying juxtaposed images in a plane perpendicular to the optical axis 8. The supporting frame 7 is movable along two perpendicular directions across the optical axis 8, being driven by motors 9 and 10 controlled through electric lines 11 and 12;

a photosensitive support mounted in a dark chamber 13, placed across the optical axis 8 and carried on a rotary circular supporting member 14 rotating on rollers 15, coaxially to the optical axis and driven by a motor 16 controlled through line 17;

the dark chamber 13 comprises a device for shifting to the next picture or for ejecting a print, this device being electrically controlled through line 18.

The data-entry and computing section B comprises a keyboard 19 with numerical keys 20, alphanumeric keys 21 and function keys 22, or any other appropriate system.

Keyboard 19 is connected by lines 24 to a computer 23 which is preferably provided with a visual display 25 to which it is linked by lines 26, for verifying the entered data in a known manner.

For one given application, the calculating unit 23 may comprise a permanent internal memory. When the apparatus is designed for multiple various applications, it may be provided with a reloadable memory 27, connected through lines 28.

The calculating unit 23 sends out orders over lines 29 to the electronic and electric control unit 30 which converts incoming signals into pulses for actuating the various motors of the optical system according to the sequence delivered by the computer.

The operation of the device is as follows:

The operator uses the keyboard 19 for defining the type of work to be carried out. For example, for establishing the astral birth theme of a person, the operator will enter on the keyboard 19 coded data corresponding to this operation after having, when appropriate, loaded into the computer the contents of a memory 27 corresponding to this work.

The operator will then introduce further needed data, verifying them on the visual display 25. These data are verified by the computer 23 and stored if found correct.

If the computer has not received all the required data, it will send out a signal requiring the missing data, otherwise it will determine those object-figures to be selected and the parameters for positioning these images, and will energize the control unit 30 controlling the various motors of the optical system A.

The sequence of operations controlled in this manner is as follows:

determining the movements required for selecting and positioning one image-figure of the array 7 relatively to the optical axis, for orienting the photosensitive surface of chamber 13, and carrying out these movements, flashing the flash-tube 2, determining the movements for selecting and positioning the next object-figure and for orienting the photosensitive frame for the corresponding next shot, and carrying out these movements, another flash from tube 2, these operations being repeated until the end of the program established by the computer 23.

The whole optical assembly A can be built in a known manner with at least one microprocessor or microcomputer, which require no further description here, being currently produced for many other applications.

According to a specific feature of this invention, the apparatus is provided with position sensors for each of the movements controlled by control unit 30. Signals from these sensors are carried on lines 31, 32 for the position of the picture array frame 7, on line 33 for the focal adjustment of the zoom lens 4, on line 34 for the position of the photosensitive surface 13, so that these positions may be automatically corrected by the calculating and control assembly B. Thus, the precision requirements for the manufacturing and assembling of the optical section A are made less stringent, bringing the cost down.

FIG. 2 shows how the object-figures are preferably inscribed in frames having the same format shown by dotted lines 35, the complete array 7 being formed by the juxtaposition of all these object-figures on the same plane. In the example shown in FIG. 2, the different object-figures are carried by a photographic support 36 inserted between a rigid translucent panel 37 and a mask 38 made of blackened metal and provided with openings 39, 40 corresponding to the useful part of the object-figures. According to circumstances, an opening such as 40 may cover the whole surface of an object-figure, and when this object-figure is passed through, the film may then be exposed over its whole surface. With smaller windows, such as 39, only a part of the film 13 will be exposed, and this part may be located, according to the invention, at any place on the photosensitive film.

The format 35 of the object-figures is such that the image of this format through the optical system 4 has dimensions at least equal to those of the photosensitive surface 13. Thus, the whole area of the film surface 13 may be exposed, starting from one object-figure, but it is moreover possible to expose this whole surface, starting from only a portion of an object-figure.

FIG. 3 shows an embodiment of the means for positioning a planar support carrying an array of pictures 7 such as illustrated by FIG. 2. This array 7 is placed in a frame 41 sliding along guides 42 mounted on a chassis 43 which is also sliding along guides 44 perpendicularly to said first set of guides 42, these guides 44 being carried by a structure 45 linked to the enclosure 1 containing the optical assembly A. Lead screws 46, 47 or equivalent devices, driven by electric motors 48, 49, drive the array frame 41.

Figure 4:
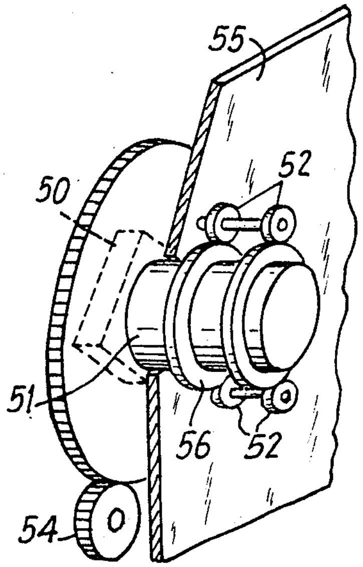
FIG. 4 is a schematic perspective view, partly cutout, of an embodiment of the rotary frame carrying the photosensitive surface on which the composite image will be formed.

FIG. 4 shows the arrangement for rotating the photosensitive medium 13: this medium 13 is placed in a housing 50 mounted on a rotary cylindrical member 51 guided between guide rolls 52 and carrying a geared crown 53 driven by a pinion 54 mounted on the shaft of a motor (not shown). Guide rolls 52 are mounted on a plate 55 integral with housing 1 (FIG. 1); the crown disk 53, the plate 55 and the collars 56 are designed for ensuring that the whole assembly is light-tight.

While in this embodiment the selection and positioning of an object-figure is made by displacement of a planar support, a modification may be adopted in which the support of the pictures is a cassette in which the object-figures are arranged sequentially on a film unwinding between two spools, the selection being made by rotating the spools and the positioning by shifting the cassette relatively to the optical axis. Alternatively, the support 7 may take the form of a drum or a disk.

According to yet a further embodiment, the support 7 may be rotary, while the film support 13 will be stationary. It is also possible to use an optical system with a constant focal length and to arrange for the object-figure to be moved along the optical axis relatively to the optical system and to the film surface. These modifications should be considered as equivalents of the dispositions described, while the latter are preferred for their simplicity.

The composite image obtained may itself be the product of the method and apparatus of the invention, particularly when using an instant-developing material. The device may also be combined with a coin-operated device for being used by the public.

In a further embodiment of the invention, use will be made of photosensitive supports suitable for the production of photoengraving masters, for manufacturing engraved articles. Engraved objects obtained through this process may have an artistic character or may be designed for utilitarian purposes, they may be produced as single or multiple works, within the scope of this invention.

What is claimed is:

1. A device for forming composite images on a photosensitive support from a pre-defined set of object-figures in accordance with a computer program corresponding to a specific desired application, the device comprising:

a light source controllably adapted to flash;

means for selectively controlling the flashing of the light source in accordance with the computer program;

a photographic optical system;

a photosensitive support positioned on the optical axis of the photographic optical system to allow an image to be formed thereon;

a support having mounted thereon an array of object-figures, the object-figures being arranged in frames of identical formats, the photosensitive support having the same format as the format of the object-figures;

a substantially ambient light-tight enclosure for housing the light source, light source control means, optical system, photosensitive support and object-figure support;

means for rotating the photosensitive support about the optical axis relative to the object-figure support;

means for selecting and positioning an object-figure in an object position on the optical axis of the photographic optical system;

means for shifting the selected object-figure relative to the photosensitive support along two directions perpendicular to the optical axis;

calculating means programmed in accordance with a predetermined combination of object-figures according to the specific application, for controlling the photosensitive support rotating means, the object-figure selection means and the object-figures shifting means; and a key board having data input keys for causing the photosensitive support to be exposed by sequential flashing of the light source, wherein selected object-figures are positioned individually in the object position along the optical axis and the photosensitive support is positioned rotatively about the optical axis in a sequence automatically controlled by the computer program of the calculating means based on data initially supplied in a single operation by the operator.

2. A device according to claim 1, characterized by the photosensitive support (13) being rotatable about the optical axis (8) relatively to the support carrying the set of object-figures (7) under the action of electromechanical drive means controlled by the calculator (23).

3. A device according to claim 1, characterized by the photographic optical system (4) having a variable focal length controlled by electromechanical means under control by the calculator (23).

4. A device according to claim 1, characterized by every object-figure being covered with a mask provided with a window (39) corresponding to the portion of said object-figure which is to be used for exposing the photosensitive support (13).

5. A device according to claim 1, characterized by the set of object-figures being in the form of an array of juxtaposed object-figures upon a same plane perpendicular to the optical axis within a frame (41), said frame being drivable along two perpendicular directions of this plane by electromechanical means controlled by the calculator (23).

6. A method of forming composite images on a photosensitive support from a pre-defined set of object-figures in accordance with a computer program corresponding to a specific desired application, the method comprising the steps of:

selectively controlling the flashing of a light source in accordance with the computer program;

positioning a photosensitive support on the optical axis of a photographic optical system to allow an image to be formed thereon;

rotating the photosensitive support about the optical axis relative to an object-figure support, the object-figure support having mounted thereon an array of object-figures, the object-figures being arranged in frames of identical formats, the photosensitive support having the same format as the format of the object-figures;

selecting and positioning an object-figure in an object position on the optical axis of the photographic optical system;

shifting the selected object-figure relative to the photosensitive support along two directions perpendicular to the optical axis;

controlling the rotation of the photosensitive support, the selection of an object-figure and the shifting of the selected object-figure by using calculating means programmed in accordance with a predetermined combination of object-figures according to the specific application; and causing the photosensitive support to be exposed by sequential flashing of the light source by using a keyboard having data input keys, wherein selected object-figures are positioned individually in the object position along the optical axis and the photosensitive support is positioned rotatively about the optical axis in a sequence automatically controlled by the computer program of the calculating means based on data initially supplied in a single operation by the operator.

7. A method according to claim 6, which includes the further step of orienting the photosensitive support relative to the selected object-figure prior to the exposure of the photosensitive support, the step of orienting the photosensitive support being controlled by the calculating means.

8. A method according to claim 6, which includes the further step of automatically adjusting the focal length of the optical system prior to the exposure of the photosensitive support by using the calculating means.

* * * * *